US009292680B2

(12) United States Patent
Gao

(10) Patent No.: US 9,292,680 B2
(45) Date of Patent: Mar. 22, 2016

(54) MOBILE TERMINAL DETECTION METHOD AND MOBILE TERMINAL

(71) Applicant: ZTE CORPORATION, Shenzhen, Guangdong Province (CN)

(72) Inventor: Xiang Gao, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/396,174

(22) PCT Filed: Jun. 26, 2013

(86) PCT No.: PCT/CN2013/077970
§ 371 (c)(1),
(2) Date: Oct. 22, 2014

(87) PCT Pub. No.: WO2013/178117
PCT Pub. Date: Dec. 5, 2013

(65) Prior Publication Data
US 2015/0067780 A1 Mar. 5, 2015

(30) Foreign Application Priority Data
Aug. 20, 2012 (CN) .......................... 2012 1 0295759

(51) Int. Cl.
G06F 7/04 (2006.01)
G06F 15/16 (2006.01)
(Continued)

(52) U.S. Cl.
CPC ................ *G06F 21/44* (2013.01); *G06F 21/73* (2013.01); *H04W 8/183* (2013.01); *H04W 12/08* (2013.01);
(Continued)

(58) Field of Classification Search
CPC ......... G06F 21/44; G06F 21/00; G06F 21/70; G06F 21/73; H04W 12/00; H04W 12/08; H04W 12/06; H04W 12/12; H04W 8/18; H04W 8/183; H04W 88/02
USPC ................ 726/3; 380/270; 455/410, 411, 425
See application file for complete search history.

(56) References Cited
U.S. PATENT DOCUMENTS 6,223,290 B1 * 4/2001 Larsen .................. H04W 12/12
380/270
6,707,915 B1 * 3/2004 Jobst et al. .................... 380/247
(Continued)

FOREIGN PATENT DOCUMENTS

CN        1722878 A      1/2006
CN     100401822 C  *   7/2008
(Continued)

OTHER PUBLICATIONS

European Search Report dated Jun. 12, 2015 of European patent Application No. 13797115.6.

*Primary Examiner* — Jayesh Jhaveri
(74) *Attorney, Agent, or Firm* — Plumsea Law Group, LLC

(57) ABSTRACT

A mobile terminal detection method and a mobile terminal. The method includes: reading a first international mobile equipment identity (IMEI) stored in a flash; comparing the first IMEI with a backup IMEI stored in a one-time programmable data (OTP) region which is prohibited from being modified; and disabling the mobile terminal when the first IMEI and the backup IMEI are inconsistent. In the present invention, the IMEI plaintext is directly backed up to the OTP region of the mobile terminal, and the value of the IMEI stored in the flash and the value of the backup IMEI are dynamically compared, so as to conveniently detect the legitimacy of the IMEI of the mobile terminal, effectively protect the IMEI number of the mobile terminal from being arbitrarily modified, and ensure the legitimate interests of users and operators.

5 Claims, 2 Drawing Sheets

(51) Int. Cl.
  *G06F 17/30* (2006.01)
  *H04L 29/06* (2006.01)
  *G06F 21/44* (2013.01)
  *H04W 8/18* (2009.01)
  *G06F 21/73* (2013.01)
  *H04W 12/08* (2009.01)
  *H04W 12/00* (2009.01)
  *H04W 12/12* (2009.01)
  *H04W 12/06* (2009.01)
  *G06F 21/70* (2013.01)
  *G06F 21/00* (2013.01)
  *H04W 88/02* (2009.01)

(52) U.S. Cl.
  CPC ............... *G06F 21/00* (2013.01); *G06F 21/70* (2013.01); *H04W 8/18* (2013.01); *H04W 12/00* (2013.01); *H04W 12/06* (2013.01); *H04W 12/12* (2013.01); *H04W 88/02* (2013.01)

(56) References Cited

U.S. PATENT DOCUMENTS

| | | | |
|---|---|---|---|
| 8,660,529 B2 * | 2/2014 | Park et al. | 455/411 |
| 2002/0120873 A1 * | 8/2002 | Salmivalli | H04W 12/12 726/32 |
| 2002/0147918 A1 | 10/2002 | Osthoff et al. | |
| 2004/0204021 A1 * | 10/2004 | Cocita | H04M 1/274516 455/550.1 |
| 2005/0079868 A1 * | 4/2005 | Shankar et al. | 455/435.1 |
| 2006/0236111 A1 | 10/2006 | Bodensjo et al. | |
| 2007/0050622 A1 * | 3/2007 | Rager et al. | 713/168 |
| 2007/0077912 A1 * | 4/2007 | Mahajan | 455/410 |
| 2007/0259683 A1 * | 11/2007 | Hartikainen et al. | 455/550.1 |
| 2011/0003581 A1 * | 1/2011 | Lee | H04W 12/12 455/410 |
| 2011/0070866 A1 * | 3/2011 | Chien | H04M 3/42136 455/411 |
| 2011/0117881 A1 * | 5/2011 | Luoma | H04L 63/08 455/410 |
| 2012/0021805 A1 * | 1/2012 | Hauck et al. | 455/558 |
| 2012/0157055 A1 * | 6/2012 | Ren | H04L 63/0853 455/411 |
| 2013/0157715 A1 * | 6/2013 | Zheng et al. | 455/551 |
| 2013/0279689 A1 * | 10/2013 | Obaidi | 380/28 |

FOREIGN PATENT DOCUMENTS

| | | | |
|---|---|---|---|
| CN | 101719959 A | | 6/2010 |
| CN | 102083055 A | * | 6/2011 |
| CN | 102625281 A | | 8/2012 |
| CN | 102831079 A | | 12/2012 |
| KR | 10-2009-0059346 A | | 6/2009 |

* cited by examiner

MOBILE TERMINAL DETECTION METHOD AND MOBILE TERMINAL

CROSS-REFERENCE TO RELATED APPLICATION(S)

This application is the US National Phase application of PCT application number PCT/CN2013/077970 having a PCT filing date of Jun. 26, 2013, which claims priority of Chinese patent application 201210295759.8 filed on Aug. 20, 2012, the disclosures of which are hereby incorporated by reference.

TECHNICAL FIELD

The present document relates to the mobile terminal technology, and more particularly, to a mobile terminal detection method and a mobile terminal.

BACKGROUND

International Mobile Equipment Identity (IMEI) consists of 15 digits, and is commonly known as serial number and stored in an EEPROM. Each mobile terminal corresponds to a unique IMEI, and will be written with a unique IMEI when assembled and delivered from the factory. From production to delivery, the IMEI will be recorded by manufacturing vendors, and it is also the archive number and ID number of said mobile terminal at the manufacturer side.

IMEI consists of TAO+FAC+SNR+SP.

1, the first six digits (TAO) are the type approval number, generally representing the model, 2, the following two digits (FAC) are the final assembling number, usually representing the origin, 3, the following 6 digits (SNR) is a string number, generally representing the production serial number, 4, the last digit (SP) is usually 0, representing the check code.

In the standby screen, inputting *#06# can check the IMEI. Only a mobile terminal having an IMEI can be used in the GSM/UMTS/LTE network, and the operators can identify the device type according to the IMEI, and then provide related services, users can also make use of the IMEI to determine whether the purchased mobile terminal is an original production or not.

Since the IMEI of said mobile terminal is written in a Flash that can be repeatedly read and written, it will be relatively easy to be modified by computer programs to deceive the network to obtain illegal status or function, thus the IMEI protection would be included within the requirements of the operator.

The related design idea proposed aiming to the IMEI protection is to use the IMEI and the device parameters to generate the checked value with the relevant algorithm and store it in an one-time programmable (OTP) region, at each time of starting up the host, said checked value will be compared, and the usage is limited if they are different; or use an external device, and said external device encrypts the IMEI with a certain encryption algorithm to form into the ciphertext which is stored together with the decryption key in said OTP region, and accesses to the plaintext data after decrypting the ciphertext with the decryption key, and then connects with the communication terminal to verify.

The abovementioned technique has the following problem: the way of protecting the IMEI is too complicated, increasing the difficulty of implementation, or it needs to use an external device to protect the IMEI, so that the mobile terminal is not convenient to use.

SUMMARY

To solve the technical problem, the embodiment of the present document provides a mobile terminal detection method and a mobile terminal, used to solve the shortcoming that the method for protecting the IMEI is too complex in the related art.

To solve the abovementioned technical problem, the embodiment of the present document provides a mobile terminal detection method, and said method comprising:

reading a first international mobile terminal equipment identity (IMEI) stored in a flash;

comparing said first IMEI with a backup IMEI stored in a one-time programmable data region which is prevented from being modified;

if said first IMEI and said backup IMEI are inconsistent, disabling said mobile terminal.

Preferably, before reading said first IMEI stored in said flash, the method further comprises:

powering up, and reading a flag file stored in said flash;

when said flag file exists, if detecting there is an initial IMEI in said flag file, writing said initial IMEI into said one-time programmable data region as a backup IMEI, and deleting said flag file.

Preferably, when said flag file exists, if the initial IMEI is not detected in said flag file, it is determined that said mobile terminal is in the production phase.

Preferably, after reading said flag file stored in said flash, the following is further comprised:

when said flag file does not exist, determining that said IMEI has been written into said one-time programmable data region of said mobile terminal as said backup IMEI, and giving a prompt.

Preferably, after comparing said first IMEI with said backup IMEI stored in said one time programmable data region, the following is further comprised:

if said first IMEI and said backup IMEI are consistent, allowing said mobile terminal to access to a network.

Preferably, after said mobile terminal accesses to said network, the following is further comprised:

when said first IMEI is modified, automatically comparing said first IMEI with said backup IMEI, if they are inconsistent, disabling said mobile terminal.

To solve the abovementioned technical problem, the embodiment of the present document further provides a mobile terminal, comprising:

a reading unit, which is set to read a first international mobile terminal equipment identity (IMEI) stored in a flash;

a checking unit, which is set to compare said first IMEI with a backup IMEI stored in an one-time programmable data region, and said one-time programmable data region is prevented from being modified; and a disabling unit, which is set to, if said first IMEI and said backup IMEI are inconsistent, disable said mobile terminal.

Preferably, said mobile terminal further comprises a writing unit, wherein:

said writing unit is set to, when powering up, read a flag file stored in said flash; when said flag file exists, if an initial IMEI is detected in said flag file, write said initial IMEI into said one-time programmable data region as said backup IMEI, and delete said flag file.

Preferably, said writing unit is further set to, when said flag file exists, if no initial IMEI is detected in said flag file, determine that said mobile terminal is in the production phase.

Preferably, said mobile terminal further comprises a prompting module, wherein:

said prompting module is set to, when said flag file does not exist, determine that said IMEI has been written into said mobile terminal, and give a prompt.

Preferably, said mobile terminal further comprises an enabling unit, wherein:

the checking unit comprises:

a one-time programmable data region reading module for reading said backup IMEI in said one-time programmable data region;

a comparing module for comparing said first IMEI with said backup IMEI;

said enabling unit is set to: if said first IMEI and said backup IMEI are consistent, allow said mobile terminal to access to the network.

Preferably, the abovementioned mobile terminal further comprises a flash detecting unit, wherein:

said flash detecting unit is set to, when said first IMEI is modified, automatically compare said first IMEI with said backup IMEI, if they are inconsistent, disable said mobile terminal.

The beneficial effects of the abovementioned technical scheme of the present document are as follows: the OTP region is prohibited from modifying the data within it, and then the backup IMEI therein may not be modified, effectively protecting the IMEI of said mobile from being modified arbitrarily, and ensuring the legitimate interests of the users and operators.

PREFERRED EMBODIMENTS OF THE PRESENT INVENTION

Hereinafter with reference to the accompanying drawings, the embodiments of the present document will be described in detail. It should be noted that, in the case of no conflict, the embodiments and features in the embodiments of the present application may be arbitrarily combined with each other.

The embodiments of the present document directly back up the IMEI plaintext into a one-time programmable data (OTP) region of a mobile terminal, and dynamically compare the value of the IMEI standardly stored in the flash with the value of said backup IMEI.

Figure 1:
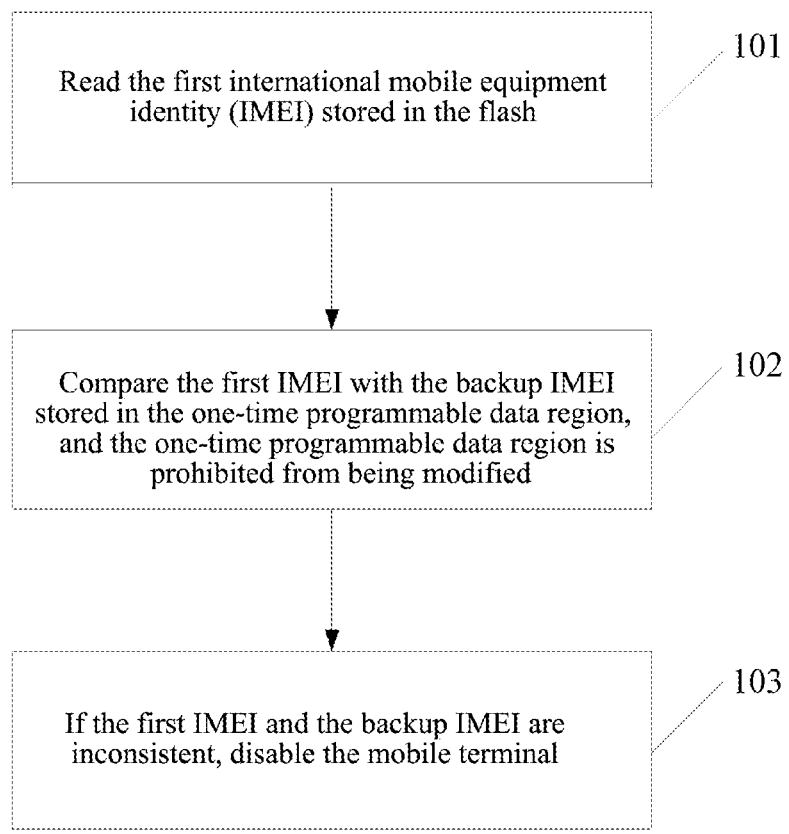
FIG. 1 is a schematic diagram of a mobile terminal detection method in accordance with an embodiment of the present document.

A mobile terminal detection method according to an embodiment of the present document, as shown in FIG. 1, comprises the following steps.

In step 101, read the first international mobile equipment identity (IMEI) stored in the flash;

In step 102, compare said first IMEI with the backup IMEI stored in the one-time programmable (OTP) data region, and said one-time programmable data region is prohibited from being modified;

In step 103, if said first IMEI and said backup IMEI are inconsistent, disable said mobile terminal.

Applying the provided technical scheme, the OTP region is prohibited to modify the data within it, and then it is impossible to modify the backup IMEI therein, effectively protecting the IMEI of said mobile terminal from being arbitrarily modified, and ensuring the legitimate interests of the users and operators.

Only after said mobile terminal accesses to the network can it enjoy the network services provided by the operators.

In a preferred embodiment, before reading the first IMEI stored in the flash, the following is further comprised:

powering up, and reading the flag file stored in the flash;

when said flag file exists, reading the initial IMEI in said flag file, if detecting the initial IMEI, writing said initial IMEI into said one-time programmable data region as said backup IMEI, and deleting said flag file.

If the original IMEI is not detected in said flag file, it is determined that said mobile terminal is in the production phase.

In one application scenario, before reading the first IMEI stored in the flash, it further comprises the process of initializing the OTP region, comprising:

step 1, power up, and read the flag file in the flash;

step 2, if there is a flag file, read the IMEI in said flag file, if no IMEI is detected, consider the device in the production phase, and normally start up the mobile terminal; If the IMEI is detected, write it into the OTP region, and delete said flag file;

step 3, if said flag file does not exist, enter into the normal IMEI validation phase of said mobile terminal.

In said step one, said flag file exist in the Flash before writing said IMEI into said mobile terminal.

In said step 2, the normal startup state is exclusively used in the research & development and production testing phases.

In a preferred embodiment, reading the flag file stored in the flash further comprises:

when said flag file does not exist, determining that said IMEI has been written into said mobile terminal, and giving a prompt.

Whether said flag file exist or not is the unique condition to judge whether said mobile terminal is in the production phase or not, if said flag file does not exist, it represents that said IMEI has been written into said mobile terminal and backed up, thus completing the production process, and being in the user using phase.

In a preferred embodiment, comparing said first IMEI with the backup IMEI stored in the one time programmable data region comprises:

reading said backup IMEI in said one-time programmable data region;

comparing said first IMEI with said backup IMEI.

In a preferred embodiment, if said first IMEI and said backup IMEI are consistent, allow said mobile terminal to access to the network.

In a preferred embodiment, after said mobile terminal accesses to the network, when said first IMEI is modified, automatically compare said first IMEI with the backup IMEI, if they are inconsistent, disable said mobile terminal.

Figure 2:
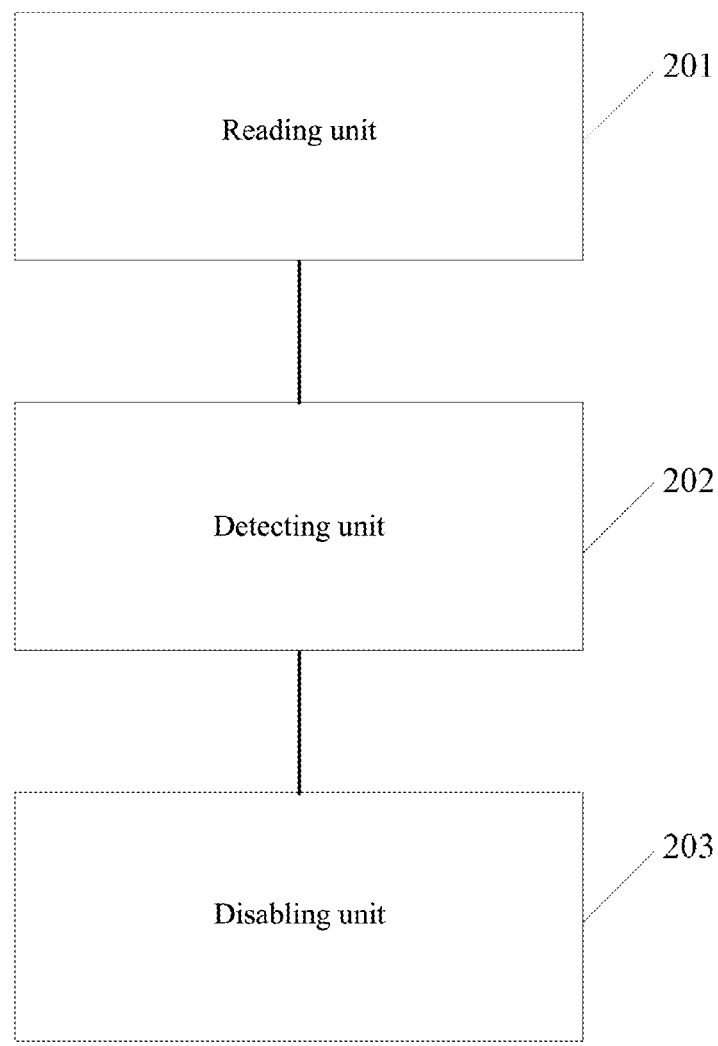
FIG. 2 a structural diagram of a mobile terminal in accordance with an embodiment of the present document.

The embodiment of the present invention provides a mobile terminal, as shown in FIG. 2, comprising:

reading unit 201, which is set to read the first international mobile equipment identity (IMEI) stored in the flash;

detecting unit 202, which is set to compare said first IMEI with the backup IMEI stored in the one-time programmable data region, and said one-time programmable data area is prohibited from being modified; and disabling unit 203, which is set to, if said first IMEI and said backup IMEI are inconsistent, disable said mobile terminal.

After using the abovementioned technical solution, directly back up said IMEI plaintext to the OTP region, protect the IMEI by dynamically comparing the value of the IMEI standardly stored in the flash with the value of the backup IMEI, so that the IMEI will not be arbitrarily rewritten, meanwhile, this function is integrated into the terminal, to achieve the dynamic self-protection of the terminal.

In a preferred embodiment, said mobile terminal further comprises a writing unit, wherein:

said writing unit is configured to, when powering up, read the flag file stored in the flash; if the initial IMEI is detected in said flag file, write said initial IMEI into said one-time programmable data region as said backup IMEI, delete said flag file; if the initial IMEI is not detected, determine that said mobile terminal is in the production phase.

In a preferred embodiment, said mobile terminal further comprises a prompting module, wherein:

said prompting module is set to, when the flag file does not exist, determine that said IMEI has been written to said mobile terminal, and give a prompt.

In a preferred embodiment, said detecting unit 202 comprises:

a one-time programmable read data region module, which is set to read the backup IMEI in said one-time programmable data region; and a comparing module, which is set to compare said first IMEI with said backup IMEI.

In a preferred embodiment, said mobile terminal further comprises an enabling unit, wherein:

said enabling unit is set to, if said first IMEI and said backup IMEI are consistent, allow said mobile terminal to access to the network.

In a preferred embodiment, said mobile terminal further comprises a flash detecting unit, wherein:

said flash detecting unit is set to, when said first IMEI is modified, automatically compare said first IMEI with said backup IMEI, if they are inconsistent, disable said mobile terminal.

After using this scheme, the advantages are: backing up the IMEI to the OTP region, when modifying said IMEI or powering up said mobile terminal, automatically detecting whether the first IMEI currently stored in the flash and the backup IMEI are consistent or not, if they are consistent, booting the host normally, if they are inconsistent, disabling the host, so as to dynamically detect the legitimacy of the IMEI of said mobile terminal; integrating this function into the terminal can effectively protect the IMEI number of said mobile terminal from being arbitrarily modified, so as to ensure the legitimate interests of the users and operators.

The above description is the preferred embodiments of the present document, and it should be noted that for a person of ordinary skill in the art, any method for protecting the IMEI backed up in the non-erasable region can also make a number of improvements and modifications without departing from the principles of the present document, and these improvements and modifications should be considered within the protection scope of the present document.

Those ordinarily skilled in the art can understand that all or some of steps of the abovementioned method may be completed by the programs instructing the relevant hardware, and said programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments can be realized in the form of hardware or software function module. The present document is not limited to any specific form of hardware and software combinations.

The above description is only preferred embodiments of the present document, and is not intended to limit the protection scope of the present document. According to the inventive content of the present document, there may be also a variety of other embodiments, and without departing from the spirit and essence of the document, those skilled in the field can make all kinds of corresponding changes and modifications in accordance with the present document, while within the spirit and principles of the present document, all changes, equivalent replacements and improvements should be included within the protection scope of the present document.

INDUSTRIAL APPLICABILITY

Compared with the relevant technology, the embodiment of the present document directly backs up the IMEI plaintext to the OTP region of the mobile terminal, and dynamically compares the value of the IMEI stored in the flash with the value of the backup IMEI, so as to conveniently detect the legitimacy of the IMEI of the mobile terminal, effectively protect the IMEI number of the mobile terminal from being modified arbitrarily, and ensure the legitimate interests of the users and operators.

I claim:

1. A mobile terminal detection method, comprising:
powering up said mobile terminal, and reading a flag file stored in a flash;
when said flag file exists, if detecting that there is an initial international mobile terminal equipment identity (IMEI) in said flag file, writing said initial IMEI into a one-time programmable data region of said mobile terminal as a backup IMEI, and deleting said flag file;
when said flag file exists, if the initial IMEI is not detected in said flag file, determining that said mobile terminal is in a production phase, and normally starting up the mobile terminal;
when said flag file does not exist, determining that said initial IMEI has been written into said one-time programmable data region of said mobile terminal as said backup IMEI, giving a prompt, and performing IMEI validation by:
reading a first IMEI stored in said flash;
comparing said first IMEI with said backup IMEI stored in said one-time programmable data region which is prohibited from being modified, to determine whether said initial IMEI is modified;
wherein if said first IMEI and said backup IMEI are inconsistent as a result of said comparing, disabling said mobile terminal, and
if said first IMEI and said backup IMEI are consistent as a result of said comparing, allowing said mobile terminal to access a network.

2. The method of claim 1,
further comprises:
when said flag file does not exist, determining that said IMEI has been written into said one-time programmable data region of said mobile terminal as said backup IMEI, giving a prompt.

3. The method of claim 1, wherein,
after said mobile terminal accesses to said network, further comprising:

when said first IMEI is modified, automatically comparing said first IMEI with said backup IMEI, if they are inconsistent, disabling said mobile terminal.

4. A mobile terminal, comprising:

circuitry including memory with program instructions stored therein;

a writing unit stored in the memory and configured to, when powering up the mobile terminal, read a flag file stored in a flash; when said flag file exists, if an initial international mobile terminal equipment identity (IMEI) is detected in said flag file, write said initial IMEI into a one-time programmable data region of said mobile terminal as a backup IMEI, and delete said flag file; when said flag file exists, if no initial IMEI is detected in said flag file, determine that said mobile terminal is in a production phase and normally starting of the mobile terminal;

a prompting module stored in the memory and configured to, when said flag file does not exist, determine that said initial IMEI has been written into said one-time programmable data region of said mobile terminal as said backup IMEI, giving a prompt; and the mobile terminal performs IMEI validation when said flag file does not exist by:

reading, by a reading unit stored in the memory, a first IMEI stored in said flash;

comparing, by a checking unit stored in the memory, said first IMEI with said backup IMEI stored in said one-time programmable data region which is prevented from being modified to determine whether said initial IMEI is modified; and disabling said mobile terminal, by a disabling unit stored in the memory, if said first IMEI and said backup IMEI are inconsistent as a result of said comparing; and allowing said mobile terminal to access a network, by an enabling unit stored in the memory, if said first IMEI and said backup IMEI are consistent as a result of said comparing.

5. The mobile terminal of claim 4, further comprising a flash detecting unit stored in the memory, wherein:

said flash detecting unit is configured to, when said first IMEI is modified, automatically compare said first IMEI with said backup IMEI, and if they are inconsistent, disable said mobile terminal.

\* \* \* \* \*